United States Patent [19]
Borkowski et al.

[11] Patent Number: 5,928,436
[45] Date of Patent: Jul. 27, 1999

[54] MEANS FOR CONTROLLING THERMAL PROPERTIES OF AMTEC CELLS

[75] Inventors: Chris A. Borkowski; Terry J. Hendricks; Robert K. Sievers, all of Ann Arbor, Mich.

[73] Assignee: Advanced Modular Power Systems, Inc., Ann Arbor, Mich.

[21] Appl. No.: 08/806,606

[22] Filed: Feb. 26, 1997

[51] Int. Cl.⁶ .................................................. H01L 35/30
[52] U.S. Cl. .......................... 136/205; 136/208; 136/209; 136/242
[58] Field of Search .................................. 136/200, 202, 136/205, 207, 208, 209, 242; 429/5, 11, 50, 104, 112, 120

[56] References Cited

U.S. PATENT DOCUMENTS

| | | | |
|---|---|---|---|
| 3,458,356 | 7/1969 | Kummer et al. | 136/83 |
| 3,511,715 | 5/1970 | Angus | 136/86 |
| 3,535,163 | 10/1970 | Dzieciuch et al. | 136/6 |
| 3,811,943 | 5/1974 | Minck et al. | 136/6 FS |
| 4,042,757 | 8/1977 | Jones | 429/104 |
| 4,049,877 | 9/1977 | Saillant et al. | 429/11 |
| 4,098,958 | 7/1978 | Bettman | 429/17 |
| 4,175,164 | 11/1979 | Cole | 429/11 |
| 4,220,692 | 9/1980 | Hunt | 429/104 |

(List continued on next page.)

OTHER PUBLICATIONS

Schock, A. et al, "Parametric Analyses of AMTEC Multitube Cells and Recommendation for Revised Cell Design", pp. 1395–1404, 1997 No Month Available.

Schock, A. et al, "Coupled Thermal, Electrical, and Fluid Flow Analyses of AMTEC Multitube Cell with Adiabatic Side Wall", pp. 1381–1394, 1997. No Month Available.

Schock, A. et al, "Design and Analysis of Radioisotope Power System Based on Revised Multitube AMTEC Cell Design", pp. 1411–1423, 1997. No Month Available.

Sievers, R.K., Hunt, T.K., Pantolin, J.E., and Butkiewicz, D.A.; "Modular Radiosotope AMTEC Power System"; paper submitted to the 10th Space Nuclear Power Symposium; Environmental Research Institute of Michigan; Ann Arbor, MI. No Date Available.

Sherrit, S., Sayer, M., and Kindl, B.; "Electrode Systems and Heat Transfer in Thermoelectric Generator Design"; Paper No. 889112; Department of Physics, Queen's University and Almax Industriex Ltd.; Ontario, Canada. No Date Available.

*Primary Examiner*—Kathryn Gorgos
*Assistant Examiner*—Thomas H Parsons
*Attorney, Agent, or Firm*—Harness, Dickey & Pierce, PLC

[57] ABSTRACT

The present invention provides an AMTEC cell having a more robust power conductance path (conduction, radiation, convection, and latent heat transfer) from the heat input surface of the cell to the working fluid, evaporation surface, and SES. More particularly, one embodiment of the present invention includes collars, post and/or bridges extending between the SES support plate and the heat input surface. In another embodiment, a plurality of channels or conduits extend between the heat input surface and SES support plate. These embodiments simultaneously increase the thermal conductance path between the heat input surface of the cell and the evaporation surface as well as between the heat input surface of the cell and the SES, and enables superheating of the working fluid. Additionally, posts, fins or heat pipes may be provided in the low pressure zone of the cell between members of the SES to simultaneously increase the conductance between the heat input surface of the cell and the evaporation surface, raise the temperature of the SES, through radiation and/or conduction heat transfer, and isothermalize the SES. Furthermore, posts, fins, or heat pipes may extend from the heat input surface of the cell to a location proximate the SES on the high pressure side to simultaneously raise the temperature of the SES through radiation and conduction heat transfer, isothermalize the SES, and superheat the working fluid through convective heat transfer.

24 Claims, 11 Drawing Sheets

U.S. PATENT DOCUMENTS

| | | | |
|---|---|---|---|
| 4,505,991 | 3/1985 | Weber | 429/11 |
| 4,510,210 | 4/1985 | Hunt | 429/11 |
| 4,686,320 | 8/1987 | Novak et al. | 136/239 |
| 4,714,798 | 12/1987 | Novak et al. | 136/239 |
| 4,808,240 | 2/1989 | Sievers | 136/202 |
| 4,847,171 | 7/1989 | Schmatz | 429/11 |
| 4,857,421 | 8/1989 | Ernst | 429/104 |
| 4,948,679 | 8/1990 | Hunt et al. | 429/11 |
| 4,965,142 | 10/1990 | Schmatz | 429/11 |
| 5,039,351 | 8/1991 | Cooper et al. | 136/202 |
| 5,085,948 | 2/1992 | Tsukamoto et al. | 429/11 |
| 5,089,054 | 2/1992 | Sievers | 136/202 |
| 5,228,922 | 7/1993 | Sievers | 136/202 |

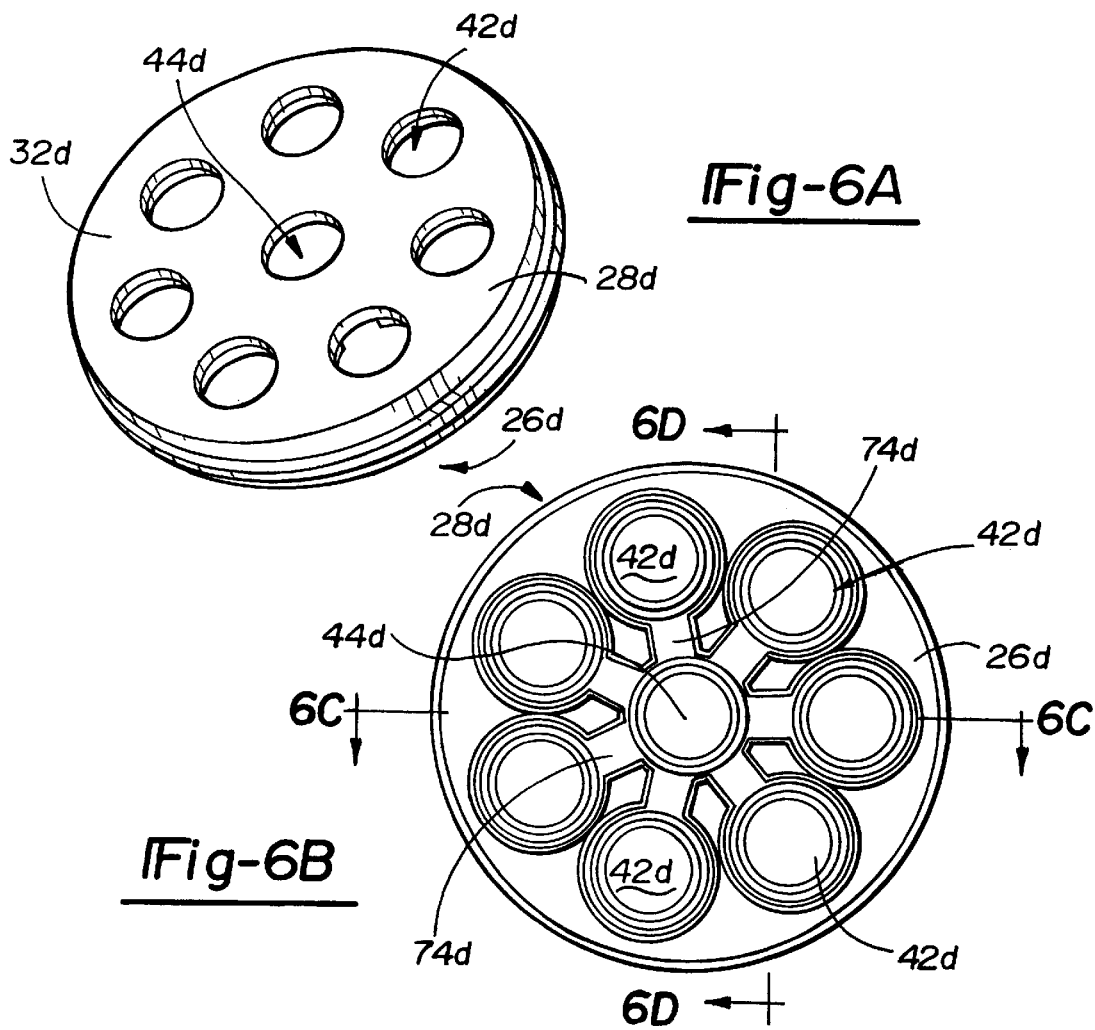
Fig-6A
Fig-6B
Fig-6C
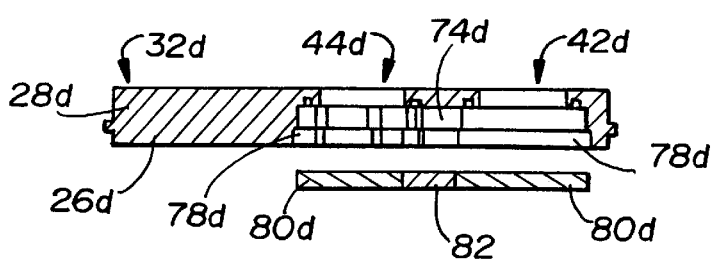
Fig-6D

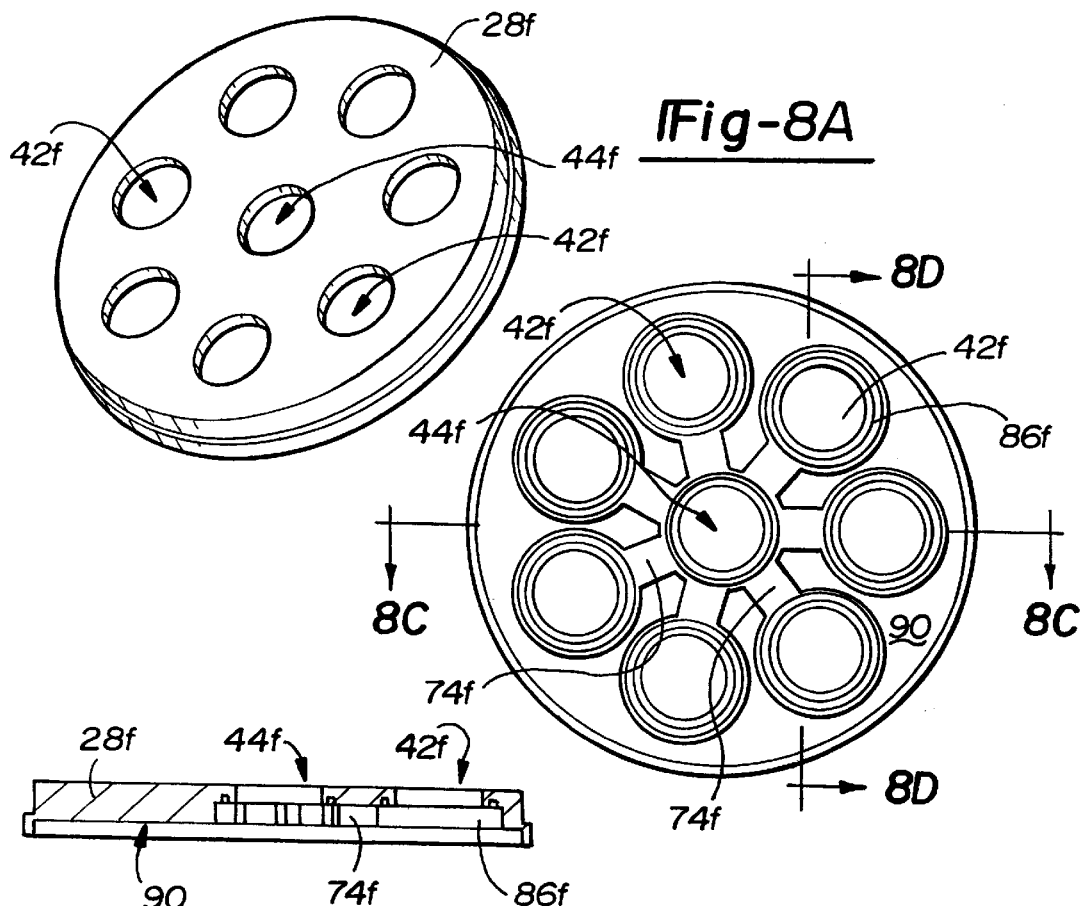

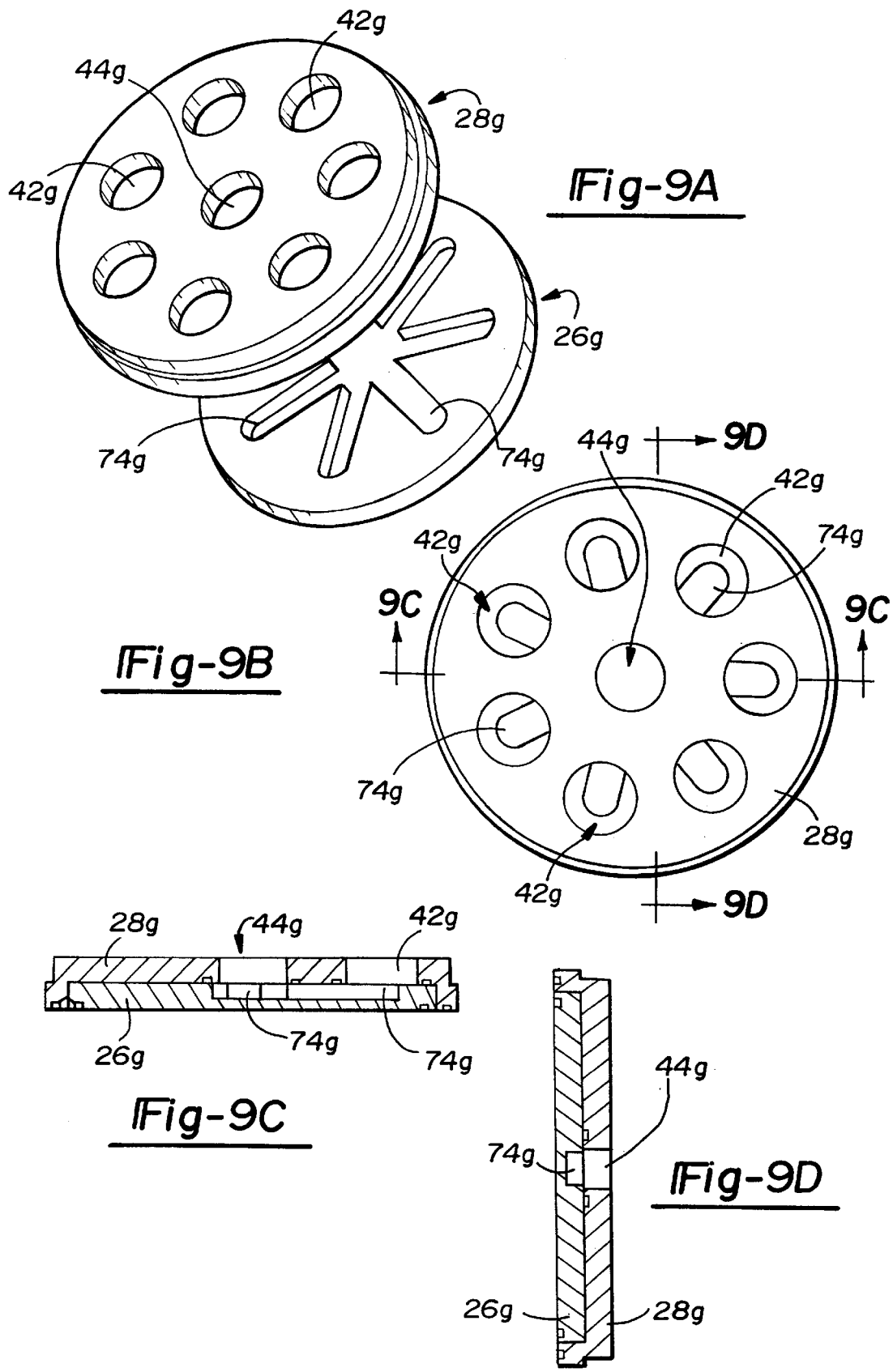

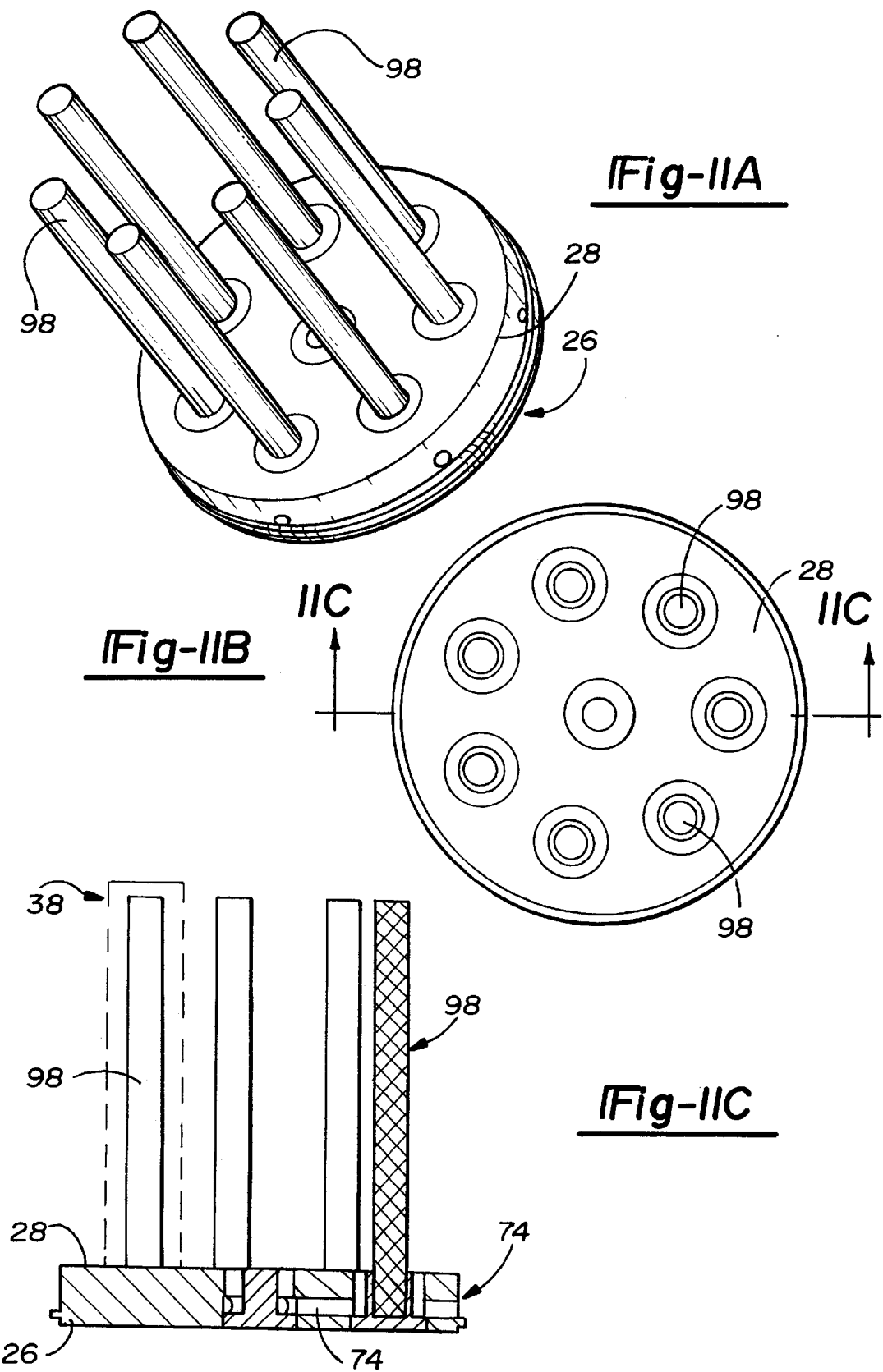

MEANS FOR CONTROLLING THERMAL PROPERTIES OF AMTEC CELLS

BACKGROUND OF THE INVENTION

1. Technical Field

The present invention generally relates to alkali metal thermal electric conversion (AMTEC) cells and more particularly to a thermal transfer apparatus for controlling the temperature of the working fluid, solid electrolyte structure and evaporation surface within the cell.

2. Discussion

AMTEC cells generally comprise a closed chamber separated into a high pressure zone and a low pressure zone by a solid electrolyte structure (SES). An alkali metal working fluid, such as sodium, is present in the high pressure zone. The SES is operable for conducting alkali metal ions but not neutral alkali metal atoms.

During operation of a vapor-vapor type of such a cell, a heat source raises the temperature of the working fluid within the high pressure zone to a high temperature and a corresponding high vapor pressure. The high pressure creates a vapor pressure differential across the SES. In response to this pressure differential, the neutral alkali metal atoms give up electrons to a permeable electrode in contact with the SES. The resulting ions travel through the SES crystal lattice with a preferred direction due to the pressure gradient. Furthermore, the electrons are given up to power an external load.

The alkali metal ions exiting the SES are neutralized by electrons delivered from a permeable, electrically conducting electrode in contact with the SES on the low pressure side. The neutralized atoms migrate through the low pressure zone to a much cooler surface where the alkali metal condenses.

The condensed liquid alkali metal is then returned back to the higher pressure zone by means of a return line. The returned liquid alkali metal is evaporated at an evaporation surface at the hot end of the return line. The evaporated, high pressure alkali metal vapor is then conveyed to the high pressure side of the SES through a common plenum at the hot end of the cell to complete a closed cycle.

In AMTEC cells capable of achieving high conversion performance, the liquid metal returning from the condenser via the return line must be vaporized. The thermal energy required to vaporize the returning liquid is a substantial portion of the total energy required for cell operation. Although prior art attempts to add heat to this site, as well as to the SES and working fluid, have been generally successful, there is room for improvement in the art.

For instance, it would be desirable to provide means for optimally transferring heat to the evaporation surface, SES and working fluid so that thermal energy is more efficiently converted to electrical energy. More particularly, it would be desirable to provide an AMTEC cell capable of providing heat from the heat input surface of the cell to the evaporation surface of the working fluid such that entropy generation is minimized. Additionally, it would be desirable to provide an AMTEC cell imparting sufficient thermal energy to the working fluid after evaporation so that the thermal dynamic state of the working fluid along its flow path from the evaporator to the SES inner current collector is such that the working fluid does not condense anywhere along this path, especially on the inner current collectors of the SES. Furthermore, it would be desirable to provide an AMTEC cell capable of providing heat to the SES through conduction and radiation heat transfer from the heat input surface of the cell and other cell components and convective heat transfer from the working fluid.

SUMMARY OF THE INVENTION

The above and other objects are provided by an AMTEC cell having a more robust power conductance path (conduction, radiation, convection, and latent heat transfer) from the heat input surface of the cell to the working fluid, evaporation surface, and SES. More particularly, one embodiment of the present invention includes collars, post and/or bridges extending between the SES support plate and the heat input surface. In another embodiment, a plurality of channels or conduits extend between the heat input surface and SES support plate. These embodiments simultaneously increase the thermal conductance path between the heat input surface of the cell and the evaporation surface as well as between the heat input surface of the cell and the SES, and enables superheating of the working fluid. Additionally, posts, fins, or heat pipes may be provided in the low pressure zone of the cell between members of the SES to simultaneously increase the conductance between the heat input surface of the cell and the evaporation surface, raise the temperature of the SES through radiation and/or conduction heat transfer, and isothermalize the SES. Furthermore, posts, fins, or heat pipes may extend from the heat input surface of the cell to a location proximate the SES on the high pressure side to simultaneously raise the temperature of the SES through radiation and conduction heat transfer, isothermalize the SES, and superheat the working fluid through convective heat transfer.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 5b is a bottom plan view of the SES support plate of FIG. 5a;

FIG. 6a is a perspective view of a first embodiment of a SES support plate for an AMTEC cell according to the present invention;

FIG. 6b is a bottom plan view of the SES support plate of FIG. 6a;

FIG. 6c is a cross-sectional view of the SES support plate of FIG. 6b taken along line C—C;

FIG. 6d is a partial cross-sectional view of the SES support plate of FIG. 6b taken along line D—D;

FIG. 7b is a top plan view of the SES support plate of FIG. 7a;

FIG. 8a is perspective view of a SES support plate for an AMTEC cell according to the present invention;

FIG. 8b is a bottom plan view of the SES support plate of FIG. 8a;

FIG. 8c is a cross-sectional view of the SES support plate of FIG. 8b taken along line C—C;

FIG. 8d is a cross-sectional view of the SES support plate of FIG. 8b taken along the line D—D;

FIG. 9a is an exploded perspective view of a fourth embodiment of a SES support plate for an AMTEC cell according to the present invention;

FIG. 9b is a top plan view of the SES support plate of FIG. 9a;

FIG. 9c is a cross-sectional view of the SES support plate of FIG. 9b taken along line C—C;

FIG. 9d is a cross-sectional view of the SES support plate of FIG. 9b taken along line D—D;

FIG. 11a is a perspective view of an alternate embodiment of the SES support plate including a plurality of thermal fins for insertion into tubular members of the SES;

FIG. 11b is a top plan view of the SES support plate of FIG. 11a; and

FIG. 11c is a cross-sectional view of the SES support plate of FIG. 11b taken along line C—C.

DETAILED DESCRIPTION OF THE PREFERRED EMBODIMENTS

The present invention is directed toward apparatus for transferring heat from the heat input surface to the working fluid, evaporation surface and solid electrolyte structure (SES) in an alkali metal thermal electric conversion (AMTEC) cell. In this way, the working fluid may be evaporated over a wide range of possible working fluid flow rates and the temperature at the evaporation surface may be sustained. The SES is provided with the proper heat to allow efficient exchange of electrons to and from alkali metal atoms and provides a structure through which an isothermal expansion occurs. Furthermore, the temperature of the SES is maintained at a temperature high enough to prevent the working fluid from condensing on the SES and shorting the high and low pressure current collectors to ground.

Figure 1:
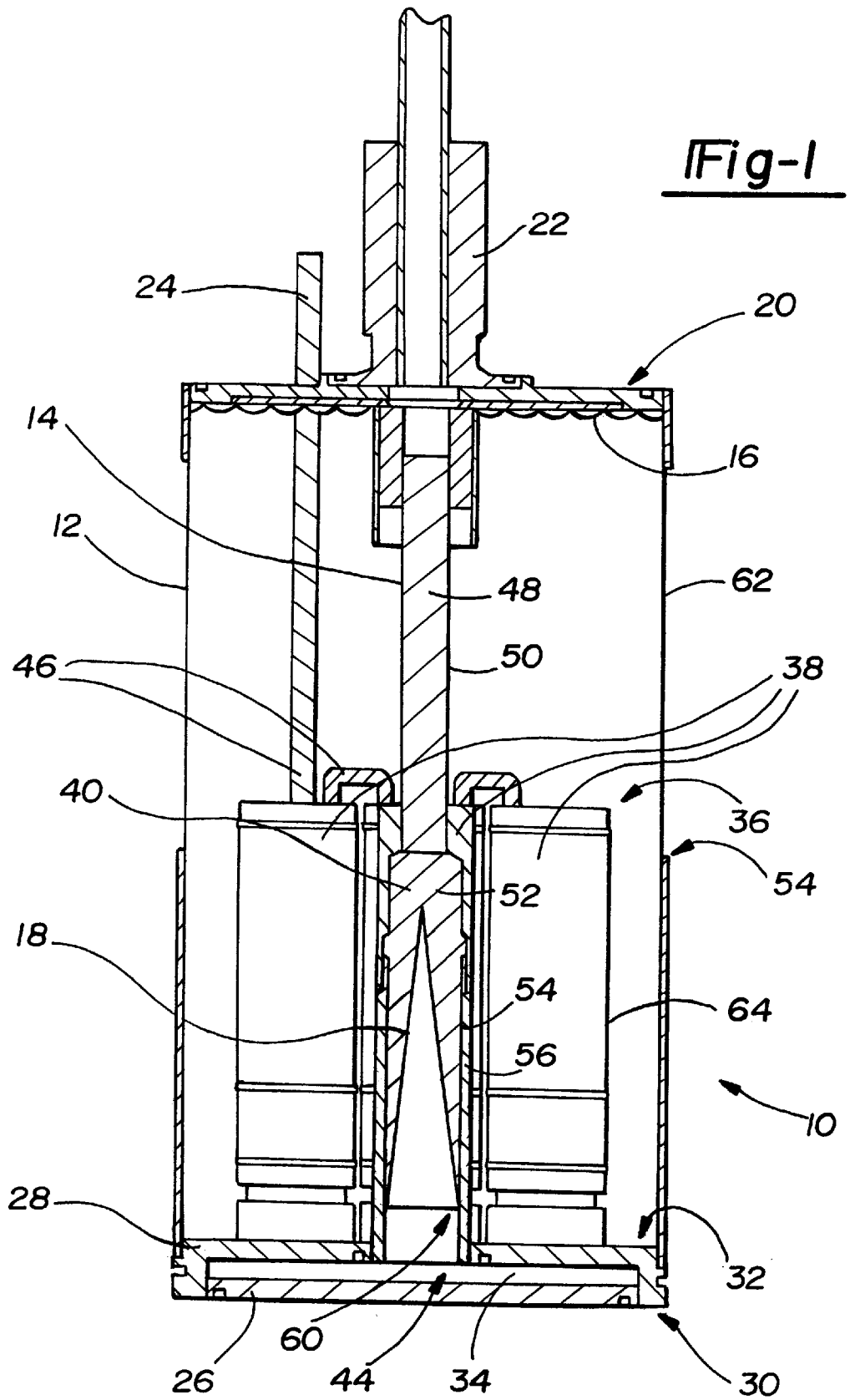
FIG. 1 is a perspective view in cross-section illustrating an alkali metal thermal electric conversion (AMTEC) device.

Turning now to the figures, an AMTEC cell 10 is illustrated in cross-section in FIG. 1. The AMTEC cell 10 includes a cell chamber 12 having an artery/wick structure 14 therein extending between a condenser 16 and an evaporation surface 18. The artery/wick structure 14 serves as a return line for the working fluid within the cell 10. It should be noted that although an artery/wick structure 14 is shown, other pumping mechanisms, such as electromagnetic pumps, may also be employed.

A cold face member 20 is secured to the chamber 12 to close a first end thereof. The condenser 16 is disposed adjacent the cold face member 20 within the chamber 12 and communicates with the artery/wick structure 14. A mounting stud 22 is secured to the cold face member 20 to support mounting of the cell 10. An electrical terminal 24 projects from the interior of the chamber 12 for facilitating electrical output from the cell 10.

A heat input surface 26 is secured to an SES support plate 28 which is disposed in the chamber 12 opposite the cold face member 20. As such, the heat input surface 26 and SES support plate 28 close a second end of the chamber 12. In the embodiment depicted, the SES support plate 28 includes an axially projecting circumferential flange 30 to which the heat input surface 26 is secured. As such, the heat input surface 26 is disposed in spaced relation to the top surface 32 of the SES support plate 28. Thus, a plenum 34 is defined therebetween fluidly communicating with the heat input surface 26, evaporation surface 18, and SES 36.

Figure 2:
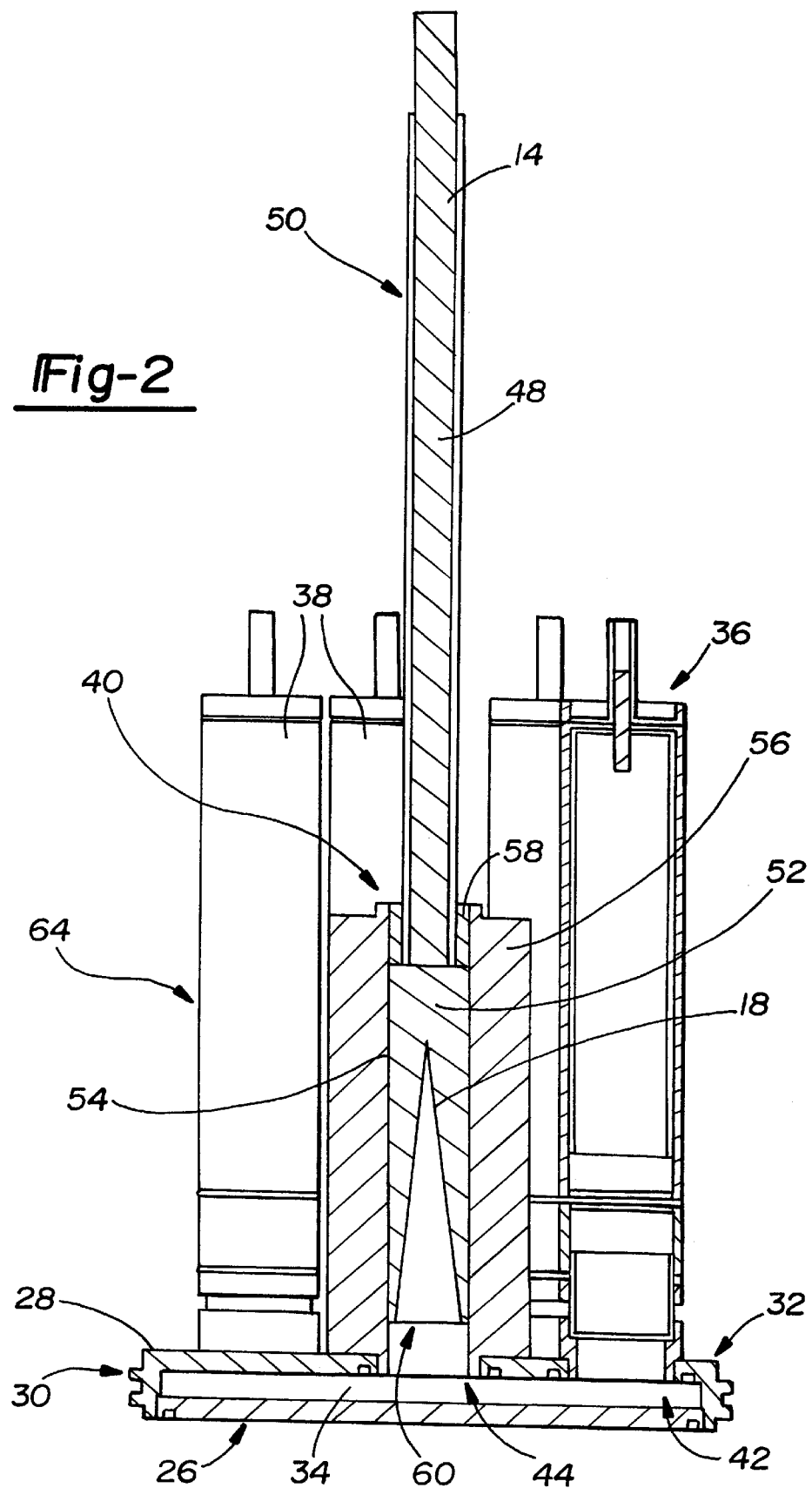
FIG. 2 is a cross-sectional view of a lower end sub-assembly of an AMTEC cell with an enhanced vapor flow tube incorporated therein.
Figure 10A:
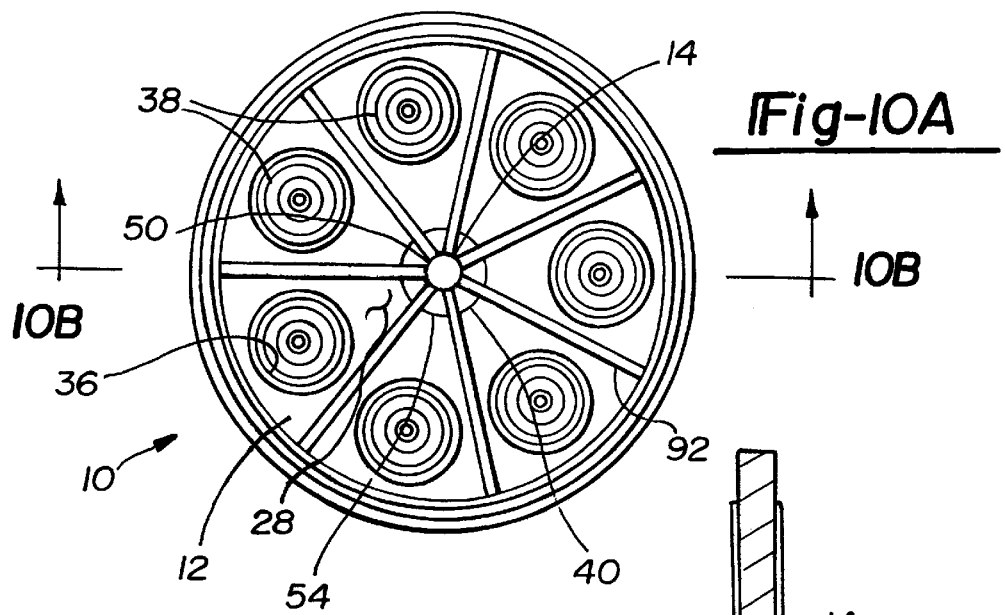
FIG. 10a is a top plan view of a lower end sub-assembly of an AMTEC cell having radial fins placed between tubular members of the SES in accordance with the teachings of the present invention.

The SES 36 includes a plurality of Beta Alumina Solid Electrolyte tubes 38 mounted to the top surface 32 of the SES support plate 28. In the embodiment shown in FIG. 1, seven tubes 38 are incorporated into the cell 10. As best seen in FIG. 10a, the tubes 38 are situated so as to encircle a centrally located vapor flow tube sub-assembly 40 (described in greater detail below). As shown in FIG. 2, the individual tubes 38 of the SES 36 fluidly communicate with the plenum 34 via a plurality of openings 42 in the SES support plate 28. Likewise, a central opening 44 in the SES support plate 28 enables fluid communication between the plenum 34 and the evaporation surface 18.

Referring again to FIG. 1, a plurality of leads 46 connect the individual tubes 38 of the SES 36 in series. The leads 46 are also connected to the terminal 24. As such, thermal energy from the working fluid atoms flowing between the high pressure zone and the low pressure zone of the cell 10 through the SES 36 is converted to electric energy and delivered from the cell 10. Although the SES 36 depicted in FIG. 1 includes the plurality of Beta Alumina Solid Electrolyte tubes 38, it should be understood that other SES configurations are suitable for incorporation herein. For example, the SES 36 could include a single solid electrolyte tube, a single flat plate, and/or a plurality of plates. Similarly, the surface of the SES 36 may incorporate means for increasing its surface area such as undulations.

Turning now to FIG. 2, the vapor flow tube sub-assembly 40 will now be described with greater detail. The vapor flow tube sub-assembly 40 is mounted atop the SES support plate 28 concentric with the central opening 44. The vapor flow tube sub-assembly 40 includes artery felt 48 disposed within an artery tube 50 which extends from the condenser 16 (FIG. 1) toward the SES support plate 28. The artery felt 48 coacts with evaporation zone felt 52 disposed within a vapor flow tube 54 extending toward the SES support plate 28. The artery tube 50 and vapor flow tube 54 are inserted within a conductance collar 56 which is mounted to the SES support plate 28. A fitting 58 may be used to interconnect the artery tube 50 and the conductance collar 56 if necessary.

The evaporation zone felt 52 includes a conical opening therein defining the evaporation surface 18 which diverges toward the SES support plate 28. As such, the broad end 60 of the evaporation surface 18 is located at a position adjacent the SES support plate 28. In this way, the evaporation surface 18 receives thermal energy from the heat input surface 26 via the plenum 34 and central opening 44.

The thickness of the conductance collar 56 is selected to provide a robust conductance path between the SES support plate 28 and vapor flow tube 54 encompassing the evaporation surface 18. This enables greater transfer of heat to the evaporation surface 18 via conduction (heat input surface 26, SES support plate 28 and conductance collar 56), convection (plenum 34 and central opening 44), and radiation (heat input surface 26).

The distance between the evaporation surface 18 and the SES support plate 28 (or heat input surface 26) has been decreased substantially over the prior art to shorten the conductance path to the evaporation surface 18. This also increases the radiative view factor magnitude between the area within the vapor flow tube 54 and the higher temperature surfaces within the AMTEC cell, for instance, heat input surface 26, SES support plate 28, SES 36, and cell wall 62 (FIG. 1). By situating the evaporation surface 18 closer to the SES support plate 28, conductive and radiative heat transfer is increased with a reduction in entropy generation due to a smaller differential temperature between the evaporation surface 18 and the higher temperature surfaces of the cell 10.

It should also be noted that the temperature of the SES 36 is controlled by conduction (heat input surface 26, the SES support plate 28, and SES tube walls 64), convection (plenum 34 and openings 42), and radiation (heat input surface 26, cell wall 12, and vapor flow tube 54). By enhancing the thickness of the conductance collar 56, a temperature margin is established between the evaporation surface 18 and the SES 36. As stated above, the current collectors of the SES 36 in a vapor-vapor AMTEC cell 10 should always be exposed to a vapor. Liquid on the current collectors could lead to electrical shorting of the cell 10 with series connected members of the SES 36. Condensation is prevented by ensuring that the temperature of the evaporation surface 18 is always less than the lowest temperature of the SES 36 or by superheating the working fluid.

Figure 3:
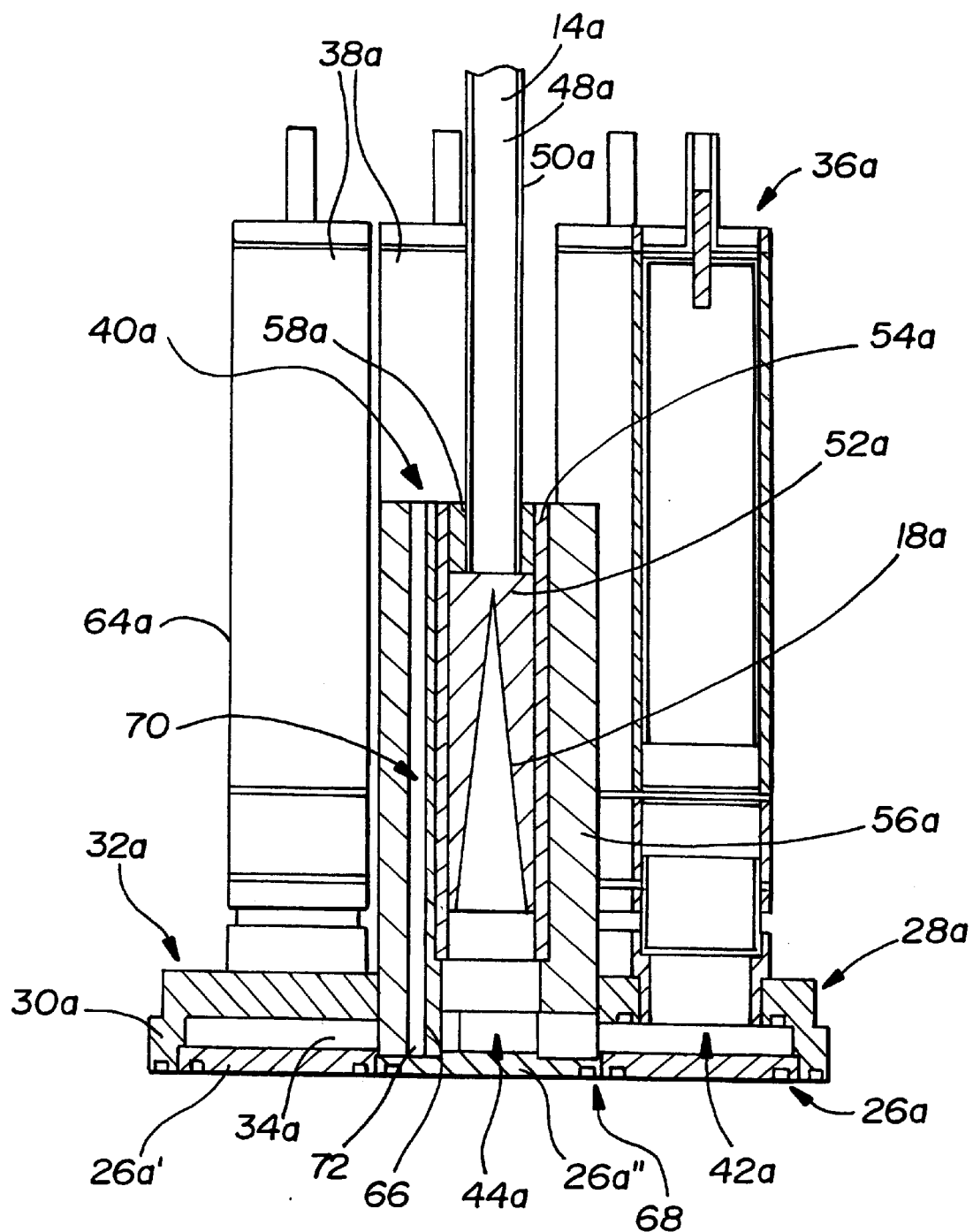
FIG. 3 is a cross-sectional view of an alternate embodiment of the lower end sub-assembly.

Referring now to FIG. 3, an alternate embodiment of a vapor flow tube sub-assembly 40a is shown. The related elements previously discussed in prior Figures are now referenced with an "a" suffix or designation in FIG. 3. In this embodiment, a thermal conduction bridge 66 extends from the heat input surface 26a through the SES support plate 28a and lies adjacent to the vapor flow tube 54a. The thermal conduction bridge 66 provides a more direct conduction path from the heat input surface 26a to the evaporation surface 18a. Also, the thickness of the vapor flow tube 54a is increased in comparison to that of FIG. 2. The wall thickness increases the conduction path from the SES support plate 28a (via the bridge 66) to the evaporation surface 18a. This provides the required heat for the evaporation of the working fluid. Previous designs have utilized a thin walled vapor flow tube which does not provide the proper conduction/radiation of thermal energy to supply the required heat to the evaporation surface. It should be noted that the thermal conduction bridge 66 may be formed integral with the heat input surface 26a or may be a discrete structure coupled thereto.

Still referring to FIG. 3, the thickness of the SES support plate 28a has been enhanced over the first embodiment (FIG. 2) to increase its conductance and isothermal properties. Further, the heat input surface 26a includes an assembly of discrete members 26a', 26a", rather than the single-piece design of FIG. 2. The outer member 26a' is generally hoop-shaped and is secured about its circumference to the SES support plate 28a. The inner member 26a" is circularly shaped and is disposed with the central void 68 of the outer member 26a'. In this way, a controlled radiative heat source can be selectively located beneath the central opening 44a and the evaporation surface 18a as well as beneath the plurality of openings 42a and the tubes 38a of the SES 36a. If desired, the thermal conduction bridge 66 may be formed integral with the inner member 26a".

This embodiment also shows the inclusion of a heat pipe 70 within the conduction bridge 66. The heat pipe 70 is coupled at a first end 72 to the inner member 26a" of the heat input surface 26a. The heat pipe 70 extends adjacent the evaporation surface 18 and supplies additional heat thereto.

Figure 4:
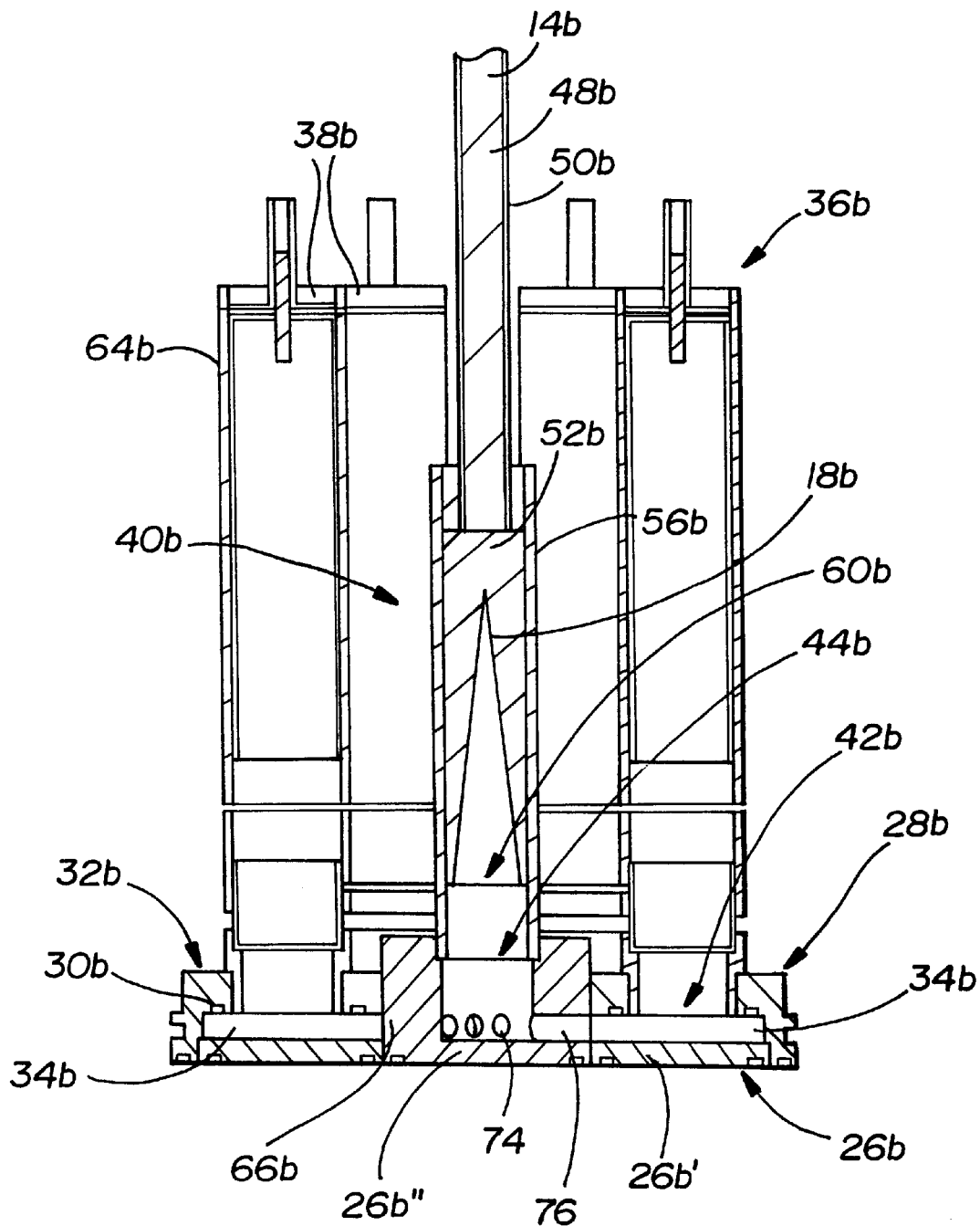
FIG. 4 is a cross-sectional view of another alternate embodiment of the lower end sub-assembly.

Turning now to FIG. 4, a third embodiment of a vapor flow tube sub-assembly 40b is illustrated. The related elements previously discussed in prior Figures are now referenced with a "b" suffix or designation in FIG. 4. In this embodiment, the thermal conduction bridge 66b is integral with the inner member 26b" of the heat input surface 26b. It should be noted that the height of the thermal conduction bridge 66b may be modified as desired to provide controlled heat delivery to the evaporation surface 18b. A plurality of working fluid conduits 74 are provided in the inner member 26b". The conduits 74 communicate with the plenum 34b for distributing the working fluid from the evaporation surface 18b to the SES 36b. The conduits 74 also facilitate superheating of the working fluid vapor by convective heat transfer. By providing the conduits 74 in the inner member 26b", a more robust interconnection between the heat input surface 26b and the SES support plate 28b is established. As such, the combination of the thermal conduction bridge 66b, heat input surface 26b, and SES support plate 28b provide high thermal transfer and low fluid flow resistance.

Referring now generally to FIGS. 5–9, multiple embodiments of the SES support plate 28 for increasing the conduction path between the heat input surface 26 and the evaporation surface 18 are illustrated. The SES support plates 28 also increase the conductance path between the heat input surface 26 and the SES 36. The SES support plates 28 also allow for superheating of the working fluid flowing from the evaporation surface 18 to the SES 36.

Preferably, the SES support plate 28 comprises as much unmachined solid material as possible since this allows for a more robust thermal conduction path to the evaporation surface 18 and SES 36. As such, the unmachined solid material provides an unimpeded thermal conduction path between the heat input surface 26 and the evaporation surface 18, SES 36, and top surface 32 of the SES support plate 28. This provides the greatest conduction path to the SES 36, the working fluid distribution paths, such as the plenum 34 and conduits 74 above, and the evaporation surface 18.

Figure 5A:
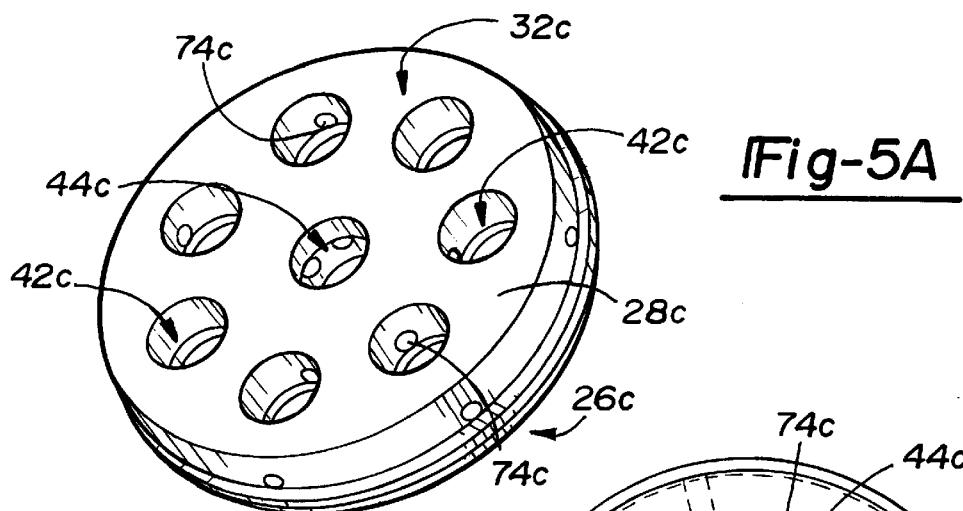
FIG. 5a is a perspective view of a first embodiment of a SES support plate for an AMTEC cell according to the present invention.
Figure 5B:
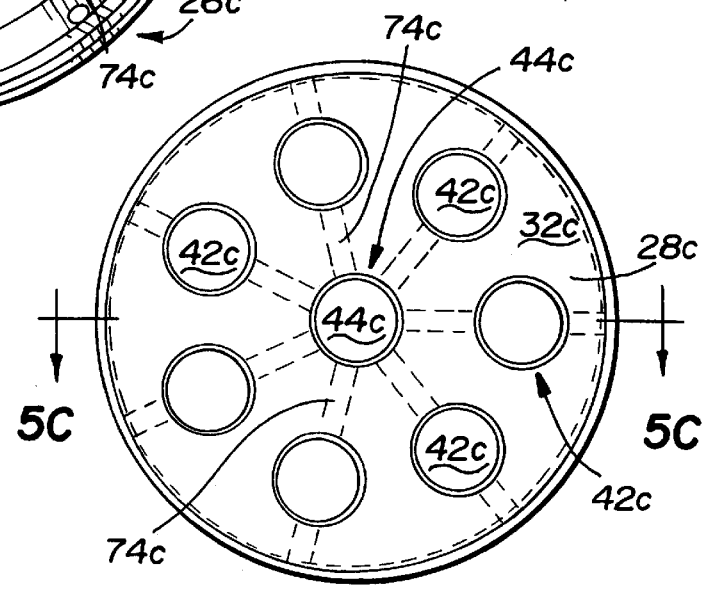

Turning now specifically to FIGS. 5a–5d, a first embodiment of an SES support plate 28c is shown. The related elements previously discussed in prior Figures are now referenced with a "c" suffix or designation in FIGS. 5a–5d. As can be seen in FIG. 5a, the SES support plate 28c is essentially circular in shape and includes a plurality of circumferentially spaced apart openings 42c. The openings 42c are arranged in a circular configuration around a central opening 44c. Preferably, the center of each opening 42c is located on a circle having its axis at the center of the opening 44c. The openings 42c are correspondingly positioned with respect to the location of the tubes 38 of the SES 36 (FIG. 2). As shown in FIG. 5b, the SES support plate 28c includes a plurality of radially extending conduits 74c interconnecting the plurality of openings 42c and the central opening 44c. The ends 76 of the conduits 74c extending beyond the openings 42c may be sealed with the cell wall 62 (FIG. 1) or may be plugged with a suitable filler.

Figure 5C:
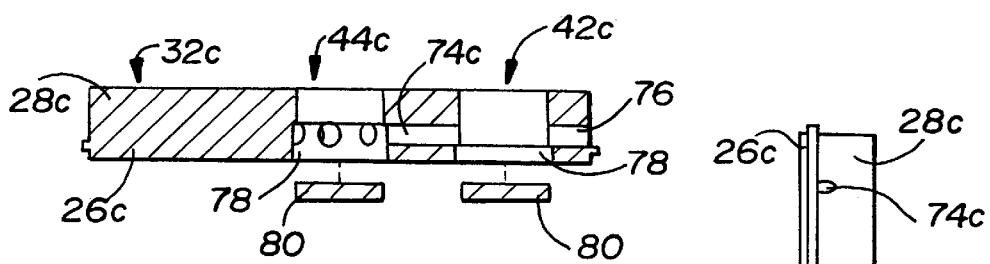
FIG. 5c is a cross-sectional view of the SFS support plate of FIG. 5b taken along line C—C.
Figure 5D:
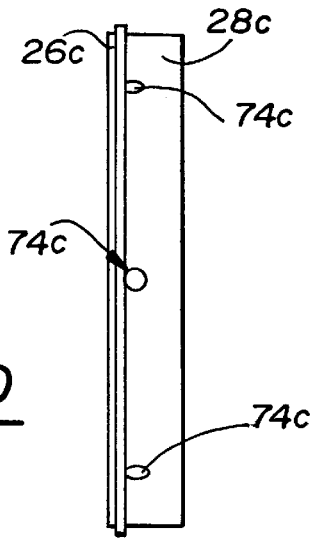
FIG. 5d is a side view of the SES support plate of FIG. 5b.
Figure 7A:
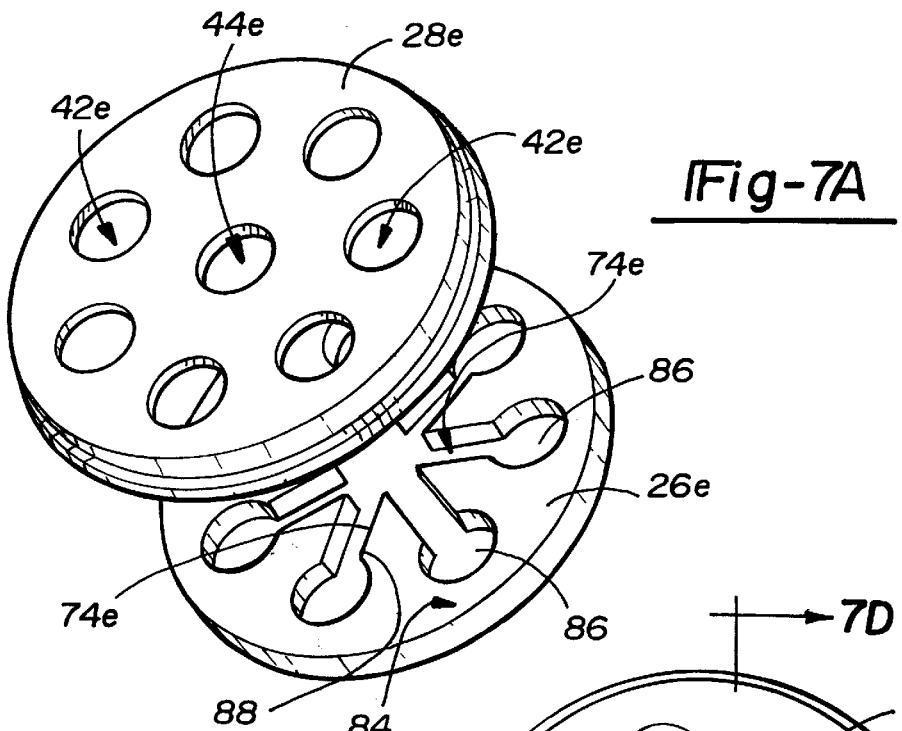
FIG. 7a is an exploded perspective view of an alternate embodiment of a SES support plate for an AMTEC cell according to the present invention.
Figure 7B:
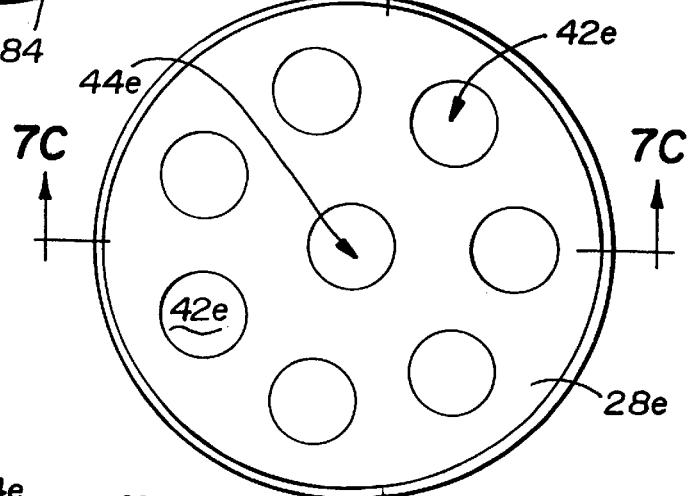
Figure 7C:
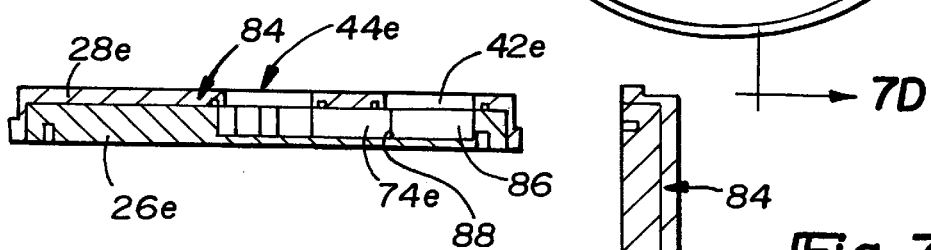
FIG. 7c is a cross-sectional view of the SES support plate of FIG. 7b taken along line C—C.
Figure 7D:
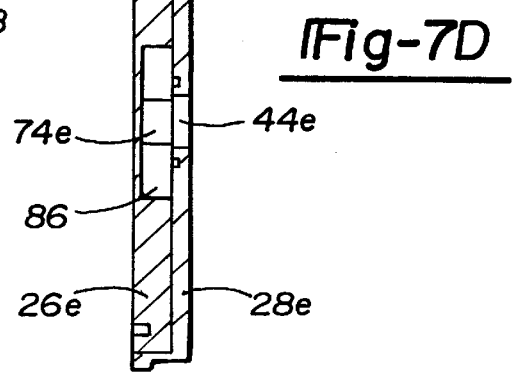
FIG. 7d is a cross-sectional view of the SES support plate of FIG. 7b taken along line D—D.

FIGS. 5c and 5d illustrate the straight through configuration of the openings 42c and central opening 44c. This configuration aids in the mounting of the SES tubes 38 (FIG. 2) to the SES support plate 28c. The lower most ends 78 of the openings 42c, 44c are sealed with individual caps 80 rather than a single-piece heat input surface 26 such as shown in FIG. 2 or the heat input surface assembly 26a such as in FIG. 3. As such, the SES support plate 28c is integral with the heat input surface 26c and serves both functions. Further, the plenum 34 (FIG. 2) is replaced by the combination of the openings 42c, 44c and the conduits 74c. It should also be noted that proper machining and alternate SES attachment to the SES support plate 28c can obviate the need for caps 80. In this case, the openings 42c and 44c are formed as recesses in the SES support plate 28c.

Referring now to FIGS. 6a–6d, a second embodiment of an SES support plate 28d is shown. The related elements previously discussed in prior Figures are now referenced with a "d" suffix or designation in FIGS. 6a–6d. This embodiment is similar to that shown in FIGS. 5a–5d except that the conduits 74c serving as working fluid distribution paths have been replaced with channels 74d formed in the bottom side of the support plate 28d between the openings 42d, 44d. In either case, the conduits 74c and channels 74d provide high conductance and low fluid flow resistance. Again, this embodiment utilizes an integral SES support plate 28d/heat input surface 26d. As such, seven small circular caps 80d and seven straight channel cap pieces 82 are coupled to the underside of the SES support plate 28d to close the channels 74d and openings 42d, 44d. Alternatively, a stamped single-piece cap assembly with integrated opening caps and channel caps can be used.

Preferably, the working fluid manifold distribution channels 74d are 0.125 inches wide and 0.065 inches deep. However, these dimensions may be modified based on the pressure of the flowing working fluid, the flow rate of the working fluid, and the amount of superheating of the working fluid that is required. The embodiments illustrated in FIGS. 5a–5d and 6a–6d have the advantage of providing a conduction path to the evaporation surface 18 that is unimpeded by thermal resistance due to an interface between separate parts.

Turning now to FIGS. 7a–7d, a third embodiment of an SES support plate 28e is shown in conjunction with a discrete heat input surface 26e rather than an integral design. The related elements previously discussed in prior Figures are now referenced with an "e" suffix or designation in FIGS. 7a–7d. As such, this embodiment utilizes both the discrete SES support plate 28e and the discrete heat input surface 26e rather than an integral design. The SES support plate 28e includes a plurality of openings 42e encircling a central opening 44e for communicating with the tubes 38 of the SES 36 and the evaporation surface 18 (FIG. 2) respectively. The heat input surface 26e has a plurality of radially extending fluid distribution channels 74e machined into its interior surface 84. Also, a plurality of circular recesses 86 are formed in the heat input surface 26e at the ends 88 of the channels 74e which align with the plurality of openings 42e formed in the SES support plate 28e.

This embodiment is easier to manufacture than the embodiment depicted in FIGS. 6a–6d due to its two piece design and therefore can be more readily incorporated into known cells. It should be noted that since the SES support plate 28e and the heat input surface 26e are separate pieces, intimate contact therebetween must be ensured. Without intimate contact between the heat input surface 26e and the SES support plate 28e, the thermal conduction between the heat input surface 26e and the evaporation surface 18 and SES 36 is not easily quantifiable.

FIGS. 8a–8d illustrate a fourth embodiment of an SES support plate 28f. In this embodiment, the manifold distribution channels 74f are machined into the bottom side 90 of the discrete SES support plate 28f. The related elements previously discussed in prior Figures are now referenced with an "f" suffix or designation in Figures FIGS. 8a–8d. Accordingly, a single-piece discrete heat input surface 26 (FIG. 2) or a discrete heat input surface 26a assembly (FIG. 3) may be used without modification to close the distribution channels 74f. Again, intimate contact between the SES support plate 28f and the heat input surface 26 or 26a should be ensured.

FIGS. 9a–9d show a fifth embodiment of an SES support plate 28g including a discrete heat input surface 26g and discrete SES support plate 28g. The related elements previously discussed in prior Figures are now referenced with a "g" suffix in FIGS. 9a—9d. This embodiment is similar to the embodiment described above in FIGS. 7a–7d except that the plurality of circular recess 86 formed at the ends 88 of the manifold distribution channels 74e of the heat input surface 26e are omitted. Also, the thickness of SES support plate 28g and heat input surface 26g have been enhanced to reduce separation due to bending/warpage from thermal stresses. As with the previous two-piece embodiments, intimate contact should be ensured.

Figure 10B:
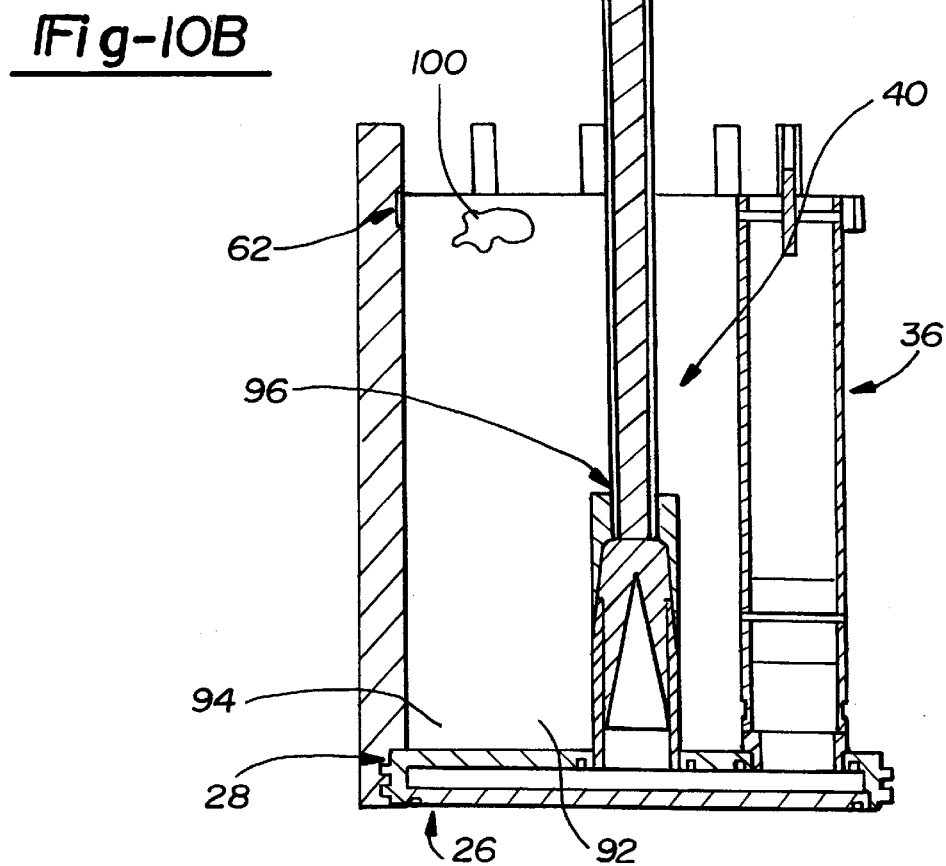
FIG. 10b is a cross-sectional view of the lower end sub-assembly of FIG. 10a taken along line B—B.

Turning now to FIGS. 10a–10b, a plurality of members 92 radially project from the vapor flow tube 54 toward the cell wall 62 such that they are interposed on the low pressure side of the cell 10 between the tubes 38 of the SES 36. Although the members 92 depicted in FIGS. 10a–10b are fins, the members 92 could also include posts or heat pipes. In the case of heat pipes, a working fluid separate from the working fluid of the cell 10 may be used. It should also be noted that the members 92 may be connected to the cell wall 62 or may terminate prior thereto as desired.

Preferably, the fins 92 are secured along a bottom surface 94 to the SES support plate 28 and along a side surface 96 to the vapor flow tube 54, conductance collar 56 or artery tube 50. The radial fins 92 provide a direct conduction path from the SES support plate 28 to the vapor flow tube 54, conductance collar 56 (FIG. 2) and artery tube 50. The radial fins 92 also provide a means to increase the radiative heat transfer to the SES 36.

The size and shape of the fins 92 is selected to raise the overall temperature of the SES 36 above the evaporation temperature of the evaporation surface 18 and minimize the increase in pressure drop of the working fluid flowing on the low pressure side of the SES 36. To do this more effectively, a material of a pre-selected emissity may be deposited on the fins 92 to transfer more heat to the cooler parts of the SES 36 than the hotter parts. Ideally, this makes the temperature distribution of the SES 36 more isothermal and raises the temperature of the SES 36 relative to the temperature of the evaporation surface 18. Thus, the radial fins 92 simultaneously increase the conduction path between the hot surfaces of the cell 10 and the evaporation surface 18, and supply power to the SES 36 through radiation heat transfer.

Referring now to FIGS. 11a–11c, a plurality of upwardly projecting elements 98 extend from the SES support plate 28. Although the elements 98 depicted are posts, the elements 98 may also be configured into a plurality of fins or heat pipes if desired for similar results. Heat pipes could transfer heat from the heat input surface 26 of the cell to the SES 36 by the additional use of a working fluid separate from the AMTEC cell working fluid. Preferably, the surface of the posts 98 or fins 92 (FIGS. 10a–10b) have a material 100, such as ceramic, with a lower radiative emissivity deposited thereon such that a higher percentage of thermal energy is radiated to cooler sections of the SES 36. The posts 98 are configured for insertion into the tubes 38 of the SES 36 (FIG. 2). It should be noted, however, that the posts 98 may also extend adjacent the high pressure side of other SES 36 configurations such as flat plates.

From the foregoing, it can be understood that the present invention facilitates the transfer of energy to the working fluid, evaporation surface and SES in an AMTEC cell. Three modes of heat transfer, conduction, radiation, and convection, along with the latent heat of vaporization and condensation are utilized to bring the required power to the evaporation surface, working fluid, and the SES. Secondarily, the present invention increases AMTEC device performance by minimizing entropy production, stabilizing the evaporation temperature, maintaining a positive temperature margin over a wide range of loads, and providing the proper power to the SES to sustain an isothermal surface over a wide range of load operating points.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises a thermal conduction bridge offset from the walls of said alkali metal thermal electric conversion cell and coupled to said heat input surface, said thermal conduction bridge extending from said heat input surface couple to said evaporation surface.

2. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises a heat pipe coupled to said heat input surface, said heat pipe extending from said heat input surface couple to said evaporation surface.

3. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises said heat input surface coupled to said support plate and a conductance collar coupled to said support plate.

4. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises said heat input surface including an axially projecting first conductance member coupled to said evaporation surface, said first conductance member including a conduit therein fluidly communicating with said solid electrolyte structure, and said heat input surface further including a second member coupled to a central member and said support plate.

5. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy comprises said support plate integral with said heat input surface, said integral support plate and heat input surface including a plurality of openings formed therein adjacent said solid electrolyte structure and said evaporation surface, and said integral support plate and heat input surface further including a conduit formed therein connecting said plurality of openings.

6. The alkali metal thermal electric conversion cell of claim 5 further comprising;

said plurality of openings including a central opening adjacent said evaporation surface;

a plurality of said solid electrolyte structures said plurality of openings further including other openings adjacent said plurality of solid electrolyte structures, said other openings circumferentially disposed about said central opening; and a plurality of said conduit radially projecting from said central opening to said other openings.

7. The alkali metal thermal electric conversion cell of claim 5 wherein a discrete end cap is secured within at least one of said openings to close a first end thereof.

8. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises said support plate integral with said heat input surface, said integral support plate and heat input surface including a plurality of openings formed therein adjacent said solid electrolyte structure and said evaporation surface, and said integral support plate and heat input surface further including a channel formed therein connecting said plurality of openings.

9. The alkali metal thermal electric conversion cell of claim 8 further comprising:

said plurality of openings including a central opening adjacent said evaporation surface;

a plurality of said solid electrolyte structures, said plurality of openings further including other openings adjacent said plurality of solid electrolyte structures, said other openings circumferentially disposed about said central opening; and a plurality of said channels, said channels radially projecting from said central opening to said other openings.

10. The alkali metal thermal electric conversion cell of claim 9 wherein a capping means is secured within said plurality of openings and said plurality of channels to close a first end thereof.

11. The alkali metal thermal electric conversion cell of claim 10 wherein said capping means further comprises a plurality of discrete opening end caps and a plurality of discrete channel end caps.

12. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises said support plate coupled to said heat input surface, said support plate having a plurality of openings formed therein adjacent said solid electrolyte structure and said evaporation surface, and said heat input surface having a channel formed therein interconnecting said plurality of openings.

13. The alkali metal thermal electric conversion cell of claim 12 further comprising:

said plurality of openings including a central opening adjacent said evaporation surface; and a plurality of said solid electrolyte structures, said plurality of openings further including other openings adjacent said plurality of solid electrolyte structures, said other openings circumferentially disposed about said central opening.

14. The alkali metal thermal electric conversion cell of claim 12 further comprising a plurality of said channels, said plurality of channels radially projecting from a center of said heat input surface to interconnect said plurality of openings.

15. The alkali metal thermal electric conversion cell of claim 12 further comprising:

a plurality of said channels;

a plurality of recesses formed in said heat input surface adjacent said plurality of openings and communicating with said plurality of channels; and said plurality of channels radially projecting from a center of said heat input surface to interconnect said plurality of recesses.

16. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure; and wherein said means for transferring said thermal energy further comprises said support plate coupled to said heat input surface, said support plate having a plurality of openings formed therein adjacent said solid electrolyte structure and said evaporation surface, and said support plate having a channel formed therein connecting said plurality of openings.

17. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

a support plate coupled to said solid electrolyte structure and cooperating therewith to separate said low pressure zone and said high pressure zone;

a condenser disposed in said low pressure zone for condensing said alkali metal working fluid;

an evaporation surface disposed in said high pressure zone for vaporizing said alkali metal working fluid;

a return line extending between said low pressure zone and said high pressure zone for recirculating said alkali working fluid;

a heat input surface disposed in said high pressure zone proximate said support plate for transferring thermal energy to said evaporation surface, said alkali metal working fluid and said solid electrolyte structure;

means for transferring thermal energy from said heat input surface to at least one of said evaporation surface, alkali metal working fluid, and solid electrolyte structure (SES) such that said alkali metal working fluid is prevented from condensing on said solid electrolyte structure, wherein said means for transferring said thermal energy is coupled to said support plate, said means for transferring said thermal energy being located in said low pressure zone adjacent said solid electrolyte structure.

18. The alkali metal thermal electric conversion cell of claim 17 wherein said means for transferring thermal energy comprises one of the group consisting of posts, fins and heat pipes.

19. The alkali metal thermal electric conversion cell of claim 18 wherein said heat pipes include a second working fluid therein independent from said alkali metal working fluid.

20. The alkali metal thermal electric conversion cell of claim 17 wherein said means for transferring thermal energy has a material with a given radiative emissivity property selectively deposited thereon for causing a higher percentage of heat to be transferred to cooler sections of the solid electrolyte surface and a lower percentage of heat to hotter sections of the solid electrolyte surface.

21. An alkali metal thermal electric conversion cell having a low pressure zone and a high pressure zone separated by a solid electrolyte structure operable for permitting ions of an alkali metal working fluid to migrate therethrough for the purpose of generating electric energy, said alkali metal thermal electric conversion cell comprising:

- a support plate coupled to said solid electrolyte structure and cooperating therewith to separate said low pressure zone and said high pressure zone;
- a condenser disposed in said low pressure zone for condensing said alkali metal working fluid;
- an evaporation surface disposed in said high pressure zone for vaporizing said alkali metal working fluid;
- a return line extending between said low pressure zone and said high pressure zone for recirculating said alkali working fluid;
- a heat input surface disposed in said high pressure zone proximate said support plate for transferring thermal energy to said evaporation surface, said alkali metal working fluid and said solid electrolyte structure;
- means for transferring thermal energy from said heat input surface to at least one of said evaporation surface, alkali metal working fluid, and solid electrolyte structure (SES) such that said alkali metal working fluid is prevented from condensing on said solid electrolyte structure; and
- wherein said means for controlling said thermal energy transfer further comprises a heat transfer member projecting from said support plate, said heat transfer member being located in said high pressure zone adjacent said solid electrolyte structure.

22. The alkali metal thermal electric conversion cell of claim 21 wherein said heat transfer member comprise one of the group consisting of posts, fins and heat pipe.

23. The alkali metal thermal electric conversion cell of claim 22 wherein said heat pipe includes a second working fluid therein independent from said alkali metal working fluid.

24. The alkali metal thermal electric conversion cell of claim 23 said heat transfer member has a material with a given radiative emissivity property selectively deposited thereon for causing a higher percentage of heat to be transferred to cooler sections of the solid electrolyte surface and a lower percentage of heat to be transferred to hotter of the solid electrolyte surface.

* * * * *